May 12, 1964 S. ABBOTT 3,132,663

TOILET TANK FILLING VALVE MECHANISM

Filed June 11, 1963

INVENTOR.
SAMUEL ABBOTT
BY
Walter F. Wessendorf Jr
Attorney

United States Patent Office 3,132,663
Patented May 12, 1964

3,132,663
TOILET TANK FILLING VALVE MECHANISM
Samuel Abbott, 64 Mohican St., Glens Falls, N.Y., assignor of fifty percent to Irving Kanner, Glens Falls, N.Y.
Filed June 11, 1963, Ser. No. 286,985
4 Claims. (Cl. 137—393)

This invention relates to a toilet tank filling valve mechanism.

The object of this invention is to provide a toilet tank filling valve mechanism whereby the toilet tank, after flushing, will be filled to a predetermined height and then the inlet water entering the tank will be automatically shut off by the closing of the valve that controls the inlet water.

This object and other objects of the invention should be appreciated from the detailed specification taken in conjunction with the drawings, wherein like reference numerals refer to similar parts, in which.

Figure 1:
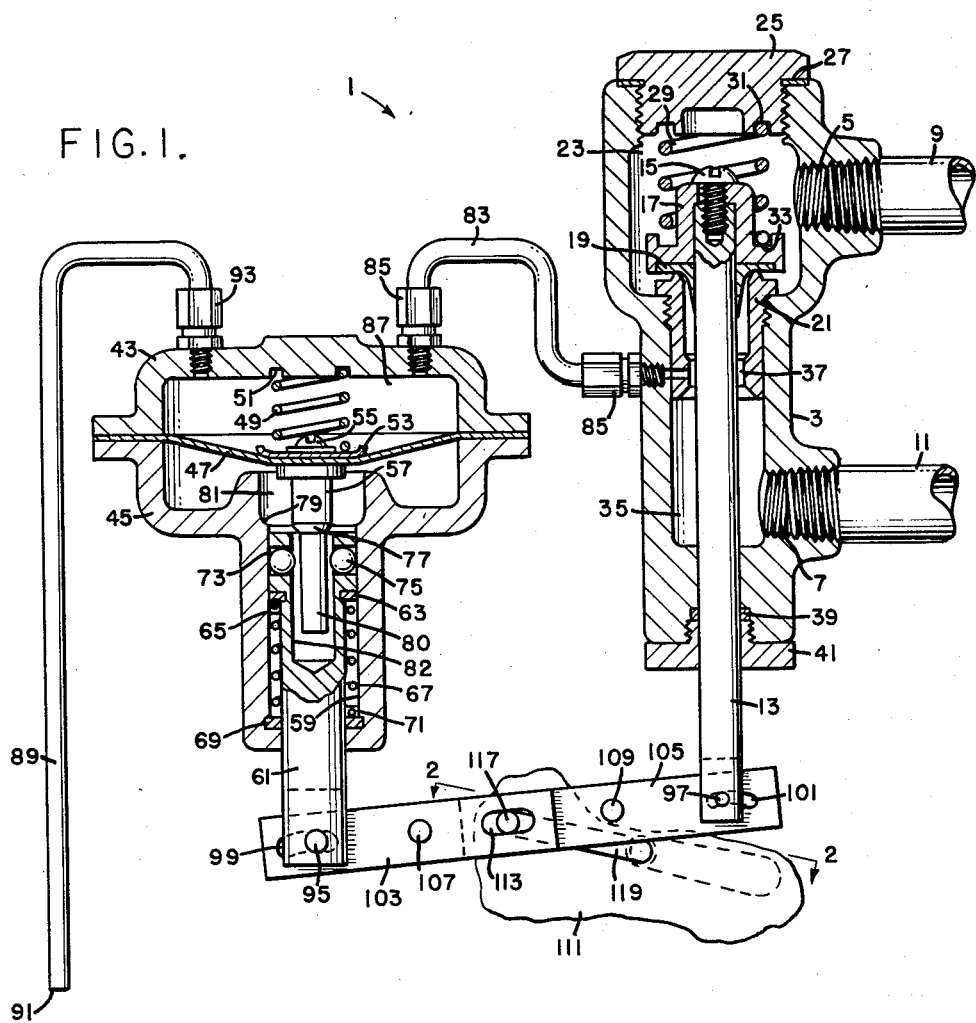
FIG. 1 is a sectional view of the toilet tank filling valve mechanism of this invention.
Figure 2:
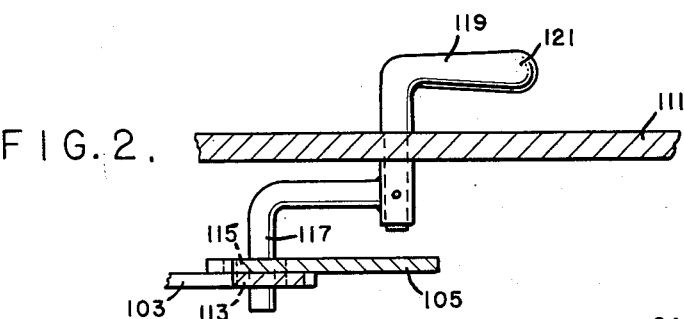
FIG. 2 is a sectional view taken along the line 2—2 of FIG. 1.

In FIG. 1 of the drawings, reference numeral 1 generally refers to the invention. As shown, a valve body 3 has two tapped holes 5 and 7, each one of same being engaged by the threaded portion of a water inlet pipe 9 and water outlet pipe 11, respectively.

Valve stem 13, disposed in the valve body 3, as shown, has at the upper end a screw 15 engaged therewith to secure a valve disc 17. Valve disc 17 carries thereon valve seal 19 which, when in abutting relationship with the valve seat 21 disposed in the valve body 3, as shown, closes the valve.

The top open portion of inlet chamber 23 is closed by a plug 25 with a gasket 27 disposed therebetween, as shown. Compression spring 29, disposed on and between spring seat 31 formed in plug 25 and spring seat 33 formed in valve disc 17, constrains the valve to its closed position.

Intermediate inlet chamber 23 and outlet chamber 35 is a narrowed passageway 37 formed internally of valve seat 21. Upon flow of water through passageway 37, a venturi effect is provided on the diaphragm. An O-ring seal 39 is disposed intermediate the bottom of outlet chamber 35 and the valve stem bushing 41, as shown.

Intermediate the upper portion 43 of the plunger housing and the lower portion 45 of the plunger housing is a diaphragm 47 which is constrained downwardly by action of the compression spring 49 disposed on and between the spring seat 51 formed in the upper portion 43 of the plunger housing and the spring seat 53 secured to diaphragm 47 by means of screw 55 engaged, as shown, with the detent release plunger 57 depending beneath diaphragm 47.

A sleeve 59 is formed in the lower portion 45 of the plunger housing. Plunger 61 reciprocates within sleeve 59 and carries a spring retainer 63 having an ear 65 mounting the tail portion of tension spring 67. The lower portion 45 of the plunger housing carries spring retainer 69 having an ear 71 mounting the other tail portion of the tension spring 67.

Formed in the upper part of plunger 61 are radial openings 73 which mount therein balls 75. Upward movement of plunger 61 will effect contact of the tapered portion 77 of plunger 61 with the balls 75 thereby causing outward movement radially of balls 75 to the extent that the balls 75 will engage the annular shoulder 79 formed in the terminal cup-like portion 81 of sleeve 59 and thereby locking plunger 61 at its position of upward movement. The terminal stem 80 of detent release plunger 57 prevents balls 75 from moving completely out of their radial openings.

It should further be appreciated that upon the upward movement of plunger 61 to its locked position, a portion of the detent release plunger of the detent release plunger 57 will slide within the sleeve 82 formed internally of plunger 61. The compression spring 49 acting downwardly upon detent release plunger 57 will maintain plunger 61 in its locked position against the return action of tension spring 67 acting upon plunger 61.

Tube 83 with male fittings 85, as shown, effects communication between suction chamber 87 and the narrowed passageway 37. The air inlet tube 89 is arranged and disposed in the toilet tank such that the lower open portion 91 of tube 89 is at the desired water level to be maintained in the tank before flushing of the toilet with which this invention is, of course, utilized. By means of male fitting 93, the air inlet 89 communicates with the suction chamber 87.

Pins 95 and 97, carried by plunger 61 and valve stem 13, respectively, engage arcuate slots 99 and 101 formed in links 103 and 105, respectively; links 103 and 105 are pivotally mounted, respectively, by pins 107 and 109 carried by the toilet tank structure 111. Aligned as shown in FIG. 1 are the common slots 113 and 115 formed, respectively, in links 103 and 105. The common slots 113 and 115 are engaged by arm 117 of first class lever 119 having a handle 121. Lever 119 is pivotally mounted in the toilet tank structure 111, as shown.

Upon the effectuation of downward movement of arm 117 in slots 113 and 115, links 103 and 105 will be pivoted around their respective pins 107 and 109. Arcuate slots 101 and 103 in the resulting upward movement will engage respective pins 95 and 97 of plunger 61 and valve stem 13 and drive same upwardly.

The valve will be opened allowing water from inlet pipe to flow into inlet chamber 23 and downwardly through passageway 37 into outlet chamber 35 and laterally through outlet pipe 11 into the toilet tank itself. Plunger 61 will move upwardly until same is locked in position as hereinbefore described.

The cooperative effect of the locked upward position of plunger 61 and the water flowing from inlet pipe 9 into inlet chamber 23 then downwardly beneath valve seal 19 through passageway 37 into outlet chamber 35 is sufficient to maintain valve disc 17 in its open position relative to valve seat 21 and against the downward restoring force of compression spring 29 acting upon valve disc 17.

When inlet water is flowing through passageway 37, air will be drawn from the lower open portion 91 through tube 89 into suction chamber 87 through tube 83 into passageway 37 and to the flowing water therethrough.

Of course, after the toilet has been flushed, water will fill the toilet tank until the water in the toilet tank reaches the level of the open portion 91 of tube 89 and blocks same. Water will continue to flow through passageway 37 and evacuate air from suction chamber 87 causing and producing thereby a partial vacuum in chamber 87 sufficient to effect upward deflection of diaphragm 47 against the downwardly acting force of spring 49. Diaphragm 47 carries with it in its upward deflection, detent release plunger 57 which is thereby freed of engagement and contact with balls 75.

The downwardly acting force of spring 67 acting on plunger 61 is therefore sufficient to move balls 75 radially inward in the downward movement and return of plunger 61 to its inoperative position.

The downward return of plunger 61 to its inoperative position cooperates to close the valve. Links 103 and 105 are thereby returned to their straight line inoperative position, cooperating with the downward force of spring 29 acting on valve disc 17 to move its valve seal 19 into abutting relationship with valve seat 19 against the open valve maintaining effect of the flowing inlet water. The return of the links 103 and 105 to their straight line inoperative position likewise returns lever 119 to its inoperative position.

Having thusly described my invention, I claim:

1. A toilet tank filling valve mechanism for use with a toilet tank wherein and whereby, after flushing of the toilet, the toilet tank will be filled to a predetermined water level and the valve automatically closed; said filling valve mechanism comprising an air inlet tube, plunger housing, diaphragm, diaphragm compression spring, detent release plunger, balls, plunger, tension spring, links, pins carried by the toilet tank structure, lever, tube, valve body, valve stem, valve seat, valve disc and valve compression spring; the diaphragm being disposed intermediate the upper and lower portions of the plunger housing with the part above the diaphragm forming the suction chamber, the air inlet tube being disposed in the toilet tank and communicating with the suction chamber, the air inlet tube having a lower open portion disposed at the water level to which the toilet tank is to be filled, the diaphragm carrying at its bottom portion a detent release plunger, the diaphragm compression spring being disposed intermediate the upper portion of the plunger housing and the diaphragm and acting downwardly upon the diaphragm, the plunger being reciprocable within the sleeve portion formed in the lower portion of the plunger housing with the sleeve portion terminating in a cup-like portion and having an annular shoulder, a sleeve portion formed in the plunger with radial openings mounting the balls therein, a spring retainer carried by the plunger housing and a spring retainer carried by the plunger and mounting therebetween the tension spring acting upon the plunger to return same in a downward direction of travel, the valve seat and valve stem carrying the valve disc being mounted in the valve body with the valve compression spring being disposed intermediate the valve body and valve disc and acting downwardly upon the valve disc, a narrowed passageway formed in the valve seat to provide a venturi effect with the inlet and outlet chambers of the valve body being disposed above and below and in communication with the narrowed passageway, a tube communicating with the suction chamber and the narrowed passageway, a water inlet pipe communicating with the inlet chamber and a water outlet pipe communicating with the outlet chamber, the one of the links being pivotally mounted on a pin carried by the toilet tank structure and being operatively connected to the plunger, the other one of the links being pivotally mounted on a pin carried by the toilet tank structure and being operatively connected to the valve stem, both of the links being commonly driven by the arm of the lever pivotally mounted by the toilet tank structure; all of the structure heretofore recited being so cooperatively and correlatively associated, arranged and constructed such that upon downward movement of the lever arm the links are pivoted about the pins carried by the toilet tank structure and effect upward movements of the valve stem and plunger, the valve stem in its upward movement opening the valve by separating the valve disc from its position of abutting relationship with the valve seat constrained by the force of the valve compression spring acting downwardly upon the valve disc, upon opening the valve the water will flow through the water inlet pipe to the inlet chamber downwardly through the narrowed passageway into the outlet chamber and through the water outlet pipe into the toilet tank to fill same, the plunger in its upward movement being locked in position upon contact of the balls by the detent release plunger and the moving of the balls by the detent release plunger and the moving of the balls outwardly by such contact to engage the annular shoulder, the detent release plunger received in the sleeve formed in the plunger being maintained in such position and in contact with the balls by force of the diaphragm compression spring acting downwardly upon the detent release plunger, and the water in the toilet tank upon reaching the level of the lower open position of the air inlet tube causing the creation of a partial vacuum in the suction chamber arising from the evacuation of air from the suction chamber to the water flowing through the narrowed passageway with such evacuation causing deflection of the diaphragm upwardly to release plunger from contact with the balls thereby effecting return of the plunger to its inoperative position by return action of the tension spring and effecting the closing of the valve cooperatively by return of the links to their straight line inoperative position and the downward force of the valve compression spring acting upon the valve disc.

2. A toilet tank filling valve mechanism for use with a toilet tank wherein and whereby, after flushing of the toilet, the toilet tank will be filled to a predetermined water level and the valve automatically closed; said filled valve mechanism comprising an air inlet tube, plunger housing, diaphragm, diaphragm compression spring, detent release plunger, balls, plunger, tension spring, links, pins carried by the toilet tank structure, lever, tube, valve body, valve stem, valve seat, valve disc and valve compression spring; the diaphragm being disposed intermediate the upper and lower portions of the plunger housing with the part above the diaphragm forming the suction chamber, the air inlet tube being disposed in the toilet tank and communicating with the suction chamber, the air inlet tube having a lower open portion disposed at the water level to which the toilet tank is to be filled, the diaphragm carrying at its bottom portion a detent release plunger, the diaphragm compression spring being disposed intermediate the upper portion of the plunger housing and the diaphragm and acting downwardly upon the diaphragm, the plunger being reciprocable within the sleeve portion formed in the lower portion of the plunger housing with the sleeve portion terminating in a cup-like portion and having an annular shoulder, a sleeve portion formed in the plunger with radial openings mounting the balls therein, a spring retainer carried by the plunger housing and a spring retainer carried by the plunger and mounting therebetween the tension spring acting upon the plunger to return same in a downward direction of travel, the valve seat and valve stem carrying the valve disc being mounted in the valve body with the valve compression spring being disposed intermediate the valve body and valve disc and acting downwardly upon a valve passageway formed in the valve seat to provide a venturi effect with the inlet and outlet chambers of the valve body being disposed above and below and in communication with the narrowed passageway, a tube communicating with the suction chamber and the narrowed passageway, a water inlet pipe communicating with the inlet chamber and a water outlet pipe communicating with the outlet chamber, the one of the links being pivotally mounted on a pin carried by the toilet tank structure and being operatively connected to the plunger by a pin carried by the plunger engaging an arcuate slot formed in this one link, the other one of the links being pivotally mounted on a pin carried by the toilet tank structure and being operatively connected to the valve stem by a pin carried by the valve stem engaging an arcuate slot formed in this other link, both of the links being driven by the arm of the lever engaging common slots formed in both links with the common slots being in alignment in the straight line inoperative position of the links, the lever being pivotally mounted by the toilet tank structure; all of the structure heretofore recited being so cooperatively and correlatively associated, arranged and constructed such that upon downward movement of the lever arm the links are pivoted about the pins carried by the toilet tank structure and effect upward movements of the valve stem and plunger, the valve stem in its upward movement opening the valve by separating the valve disc from its position of abutting relationship with the valve seat constrained by the force of the valve compression spring acting downwardly upon the valve disc, upon opening the valve the water will flow through the water inlet pipe to the inlet chamber downwardly through the narrowed passageway into the outlet chamber and through the water outlet pipe into the toilet tank to fill same, the plunger in its upward movement being locked in position upon contact of the balls by the detent release plunger and the moving of the balls outwardly by such contact to engage the annular shoulder, the detent release plunger received in the sleeve formed in the plunger being maintained in such position and in contact with the balls by force of the diaphragm compression spring acting downwardly upon the detent release plunger, and the water in the toilet tank upon reaching the level of the lower open position of the air inlet tube causing the creation of a partial vacuum in the suction chamber arising from the evacuation of air from the suction chamber to the water flowing through the narrowed passageway with such evacuation causing deflection of the diaphragm upwardly to release the detent release plunger from contact with the balls thereby effecting return of the plunger to its inoperative position by return action of the tension spring and effecting the closing of the valve cooperatively by return of the links to their straight line inoperative position and the downward force of the valve compression spring acting upon the valve disc.

3. A toilet tank filling valve mechanism for use with a toilet tank wherein and whereby after flushing of the toilet, the toilet tank will be filled to a predetermined water level and the valve automatically closed; said filling valve mechanism comprising an air inlet tube, plunger housing, diaphragm, diaphragm compression spring, detent release plunger, balls, plunger, tension spring, links, pins carried by the toilet tank structure, lever, tube, valve body, valve stem, valve seat, valve disc and valve compression spring; the diaphragm being disposed intermediate the upper and lower portions of the plunger housing with the part above the diaphragm forming the suction chamber, the air inlet tube being disposed in the toilet tank and communicating with the suction chamber, the air inlet tube having a lower open portion disposed at the water level to which the toilet tank is to be filled, the diaphragm carrying at its bottom portion a detent release plunger, the diaphragm compression spring being being disposed intermediate the upper portion of the plunger housing and the diaphragm and acting downwardly upon the diaphragm, the diaphragm compression spring being mounted on a spring seat formed in the upper portion of the plunger housing and a spring seat secured to the diaphragm interposed between the spring seat and detent release plunger with securment achieved by a screw engaged with the detent release plunger, the plunger being reciprocable within the sleeve portion formed in the lower portion of the plunger housing with the sleeve portion terminating in a cup-like portion and having an annular shoulder, a sleeve portion formed in the plunger with radial openings mounting the balls therein, a spring retainer carried by the plunger housing and a spring retainer carried by the plunger and mounting therebetween the tension spring acting upon the plunger to return same in a downward direction of travel, the valve seat and valve stem carrying the valve disc being mounted in the valve body with the valve compression spring being disposed intermediate the valve body and valve disc and acting downwardly upon the valve disc, the valve compression spring being mounted on a spring seat formed in a plug engaged with the valve body at the top part thereof and a spring seat formed in the valve disc, a narrowed passageway formed in the valve seat to provide a venturi effect with the inlet and outlet chambers of the valve body being disposed above and below and in communication with the narrowed passageway, a tube communicating with the suction chamber and the narrowed passageway, a water inlet pipe communicating with the inlet chamber and a water outlet pipe communicating with the outlet chamber, the one of the links being pivotally mounted on a pin carried by the toilet tank structure and being operatively connected to the plunger, the other one of the links being pivotally mounted on a pin carried by the toilet tank structure and being operatively connected to the valve stem, both of the links being commonly driven by the arm of the lever piovtally mounted by the toilet tank structure; all of the structure heretofore recited being so cooperatively and correlatively associated, arranged and constructed such that upon downward movement of the lever arm the links are pivoted about the pins carried by the toilet tank structure and effect upward movements of the valve stem and plunger, the valve stem in its upward movement opening the valve by separating the valve disc from its position of abutting relationship with the valve seat constrained by the force of the valve compression spring acting downwardly upon the valve disc, upon opening the valve the water will flow through the water inlet pipe to the inlet chamber downwardly through the narrowed passageway into the outlet chamber and through the water outlet pipe into the toilet tank to fill same, the plunger in its upward movement being locked in position upon contact of the balls by the detent release plunger and the moving of the balls outwardly by such contact to engage the annular shoulder, the detent release plunger received in the sleeve formed in the plunger being maintained in such position and in contact with the balls by force of the diaphragm compression spring acting downwardly upon the detent release plunger, and the water level in the toilet tank upon reaching the level of the lower open position of the air inlet tube causing the creation of a partial vacuum in the suction chamber arising from the evacuation of air from the suction chamber to the water flowing through the narrowed passageway with such evacuation causing deflection of the diaphragm upwardly to release the detent release plunger from contact with the balls thereby effecting return of the plunger to its inoperative position by return action of the tension spring and effecting the closing of the valve cooperatively by return of the links to their straight line inoperative position and the downward force of the valve compression spring acting upon the valve disc.

4. A toilet tank filling valve mechanism for use with a toilet tank wherein and whereby, after flushing of the toilet, the toilet tank will be filled to a predetermined water level and the valve automatically closed; said filling valve mechanism comprising an air inlet tube, plunger housing, diaphragm, diaphragm compression spring, detent release plunger, balls, plunger, tension spring, links, pins carried by the toilet tank structure, lever, tube, valve body, valve stem, valve seat, valve disc and valve compression spring; the diaphragm being disposed intermediate the upper and lower portions of the plunger housing with the part above the diaphragm forming the suction chamber, the air inlet tube being disposed in the toilet tank and communicating with the suction chamber, the air inlet tube having a lower open portion disposed at the water level to which the toilet tank is to be filled, the diaphragm carrying at its bottom portion a detent release plunger, the diaphragm compression spring being disposed intermediate the upper portion of the plunger housing and the diaphragm and acting downwardly upon the diaphragm, the diaphragm compression spring being mounted on a spring seat formed in the upper portion of the plunger housing and a spring seat secured to the diaphragm interposed between the spring seat and detent release plunger with securement achieved by a screw engaged with the detent release plunger, the plunger being reciprocable within the sleeve portion formed in the lower portion of the plunger housing with the sleeve portion terminating in a cup-like portion and having an annular shoulder, a sleeve portion formed in the plunger with radial openings mounting the balls therein, a spring retainer carried by the plunger housing and a spring retainer carried by the plunger and mounting therebetween the tension spring acting upon the plunger to return same in a downward direction of travel, the valve seat and valve stem carrying the valve disc being mounted in the valve body and the valve compression spring being disposed intermediate the valve body and valve disc and acting downwardly upon the valve disc, the valve compression spring being mounted on a spring seat formed in a plug engaged with the valve body at the top part thereof and a spring seat formed in the valve disc, a narrowed passageway formed in the valve seat to provide a venturi effect with the inlet and outlet chambers of the valve body being disposed above and below and in communication with the narrowed passageway, a tube communicating with the suction chamber and the narrowed passageway, a water inlet pipe communicating with the inlet chamber and a water outlet pipe communicating with the outlet chamber, the one of the links being pivotally mounted on a pin carried by the toilet tank structure and being operatively connected to the plunger by a pin carried by the plunger engaging an arcuate slot formed in this one link, the other one of the links being pivotally mounted on a pin carried by the toilet tank structure and being operatively connected to the valve stem by a pin carried by the valve stem engaging an arcuate slot formed in this other link, both of the links being driven by the arm of the lever engaging common slots formed in both links with the common slots being in alignment in the straight line inoperative position of the links, the lever being pivotally mounted by the toilet tank structure; all of the structure heretofore recited being so cooperatively and correlatively associated, arranged and constructed such that upon downward movement of the lever arm the links are pivoted about the pins carried by the toilet tank structure and effect upward movements of the valve stem and plunger, the valve stem in its upward movement opening the valve by separating the valve disc from its position of abutting relationship with the valve seat constrained by the force of the valve compression spring acting downwardly upon the valve disc, upon opening the valve the water will flow through the water inlet pipe to the inlet chamber downwardly through the narrowed passageway into the outlet chamber and through the water outlet pipe into the toilet tank to fill same, the plunger in its upward movement being locked in position upon contact of the balls by the detent release plunger and the moving of the balls outwardly by such contact to engage the annular shoulder, the detent release plunger received in the sleeve formed in the plunger being maintained in such position and in contact with the balls by force of the diaphragm compression spring acting downwardly upon the detent release plunger, and the water level in the toilet tank upon reaching the level of the lower open position of the air inlet tube causing the creation of a partial vacuum in the suction chamber arising from the evacuation of air from the suction chamber to the water flowing through the narrowed passageway with such evacuation causing deflection of the diaphragm upwardly to release the detent release plunger from contact with the balls thereby effecting return of the plunger to its inoperative position by return action of the tension spring and effecting the closing of the valve cooperatively by return of the links to their straight line inoperative position and the downward force of the valve compression spring acting upon the valve disc.

References Cited in the file of this patent

UNITED STATES PATENTS

| | | |
|---|---|---|
| 2,796,090 | Carriol | June 18, 1957 |
| 2,903,025 | Richards | Sept. 8, 1959 |
| 3,082,785 | Radway | Mar. 26, 1963 |
| 3,085,600 | Briede | Apr. 16, 1963 |